United States Patent
De France

(10) Patent No.: US 7,342,175 B2
(45) Date of Patent: Mar. 11, 2008

(54) ELECTRICAL CONNECTOR

(75) Inventor: Robert V. De France, Poughkeepsie, NY (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 11/517,142

(22) Filed: Sep. 6, 2006

(65) Prior Publication Data

US 2007/0062718 A1   Mar. 22, 2007

Related U.S. Application Data

(60) Provisional application No. 60/718,529, filed on Sep. 19, 2005.

(51) Int. Cl.
*H01R 4/00* (2006.01)
(52) U.S. Cl. .................. 174/84 R; 174/88 S
(58) Field of Classification Search .......... 174/84 R, 174/92, 94 R
See application file for complete search history.

(56) References Cited

U.S. PATENT DOCUMENTS

| | | | | |
|---|---|---|---|---|
| 409,181 | A * | 8/1889 | De Ferranti ............ 285/53 |
| 454,181 | A * | 6/1891 | Stout et al. ............ 174/84 S |
| 1,793,293 | A * | 2/1931 | Varney et al. .......... 403/284 |
| 1,886,086 | A * | 11/1932 | Damon ................ 403/185 |
| 2,148,173 | A | 2/1939 | Rogoff ................ 24/126 |
| 2,463,145 | A * | 3/1949 | Buchanan ............. 439/784 |
| 2,554,387 | A | 5/1951 | Saul .................. 287/75 |
| 2,902,537 | A * | 9/1959 | Salvi ................. 174/79 |
| 2,988,727 | A | 6/1961 | Berndt ............... 339/273 |
| 3,345,454 | A * | 10/1967 | Mixon, Jr. ............ 174/84 R |
| 3,384,704 | A * | 5/1968 | Vockroth ............. 174/90 |
| 3,515,794 | A * | 6/1970 | Beinhaur et al. ....... 174/90 |
| 3,996,417 | A * | 12/1976 | Annas ................ 174/90 |
| 4,362,352 | A * | 12/1982 | Hawkins et al. ....... 439/788 |
| 4,453,034 | A * | 6/1984 | Annas et al. ......... 174/79 |
| 4,458,976 | A | 7/1984 | Hudson et al. ........ 339/248 R |
| 4,511,280 | A * | 4/1985 | Saint-Prix et al. ..... 403/274 |
| 4,525,992 | A * | 7/1985 | Payen ................ 57/18 |
| 4,614,399 | A * | 9/1986 | Gemra et al. ......... 439/404 |
| 5,301,422 | A | 4/1994 | Uzelac ............... 29/869 |
| 5,594,212 | A * | 1/1997 | Nourry et al. ........ 174/88 R |
| 5,683,273 | A * | 11/1997 | Garver et al. ........ 439/784 |
| 6,015,953 | A * | 1/2000 | Tosaka et al. ........ 174/79 |
| 6,105,247 | A * | 8/2000 | Varreng .............. 29/871 |
| 6,381,512 | B1 * | 4/2002 | Saitou et al. ........ 700/200 |
| 6,599,059 | B2 | 7/2003 | Calandra, Jr. et al. ... 405/259.4 |
| 6,805,596 | B2 * | 10/2004 | Quesnel et al. ....... 439/877 |
| 7,019,217 | B2 * | 3/2006 | Bryant ............... 174/88 R |
| 7,041,909 | B2 * | 5/2006 | Hiel et al. ........... 174/88 R |
| 2004/0132366 | A1 | 7/2004 | Hiel et al. ........... 442/43 |
| 2005/0006129 | A1 | 1/2005 | Bryant ............... 174/88 R |

FOREIGN PATENT DOCUMENTS

WO   WO-2005/041358 A2   5/2005

* cited by examiner

*Primary Examiner*—William H. Mayo, III
(74) *Attorney, Agent, or Firm*—Harrington & Smith, PC

(57) ABSTRACT

A splice electrical connector for connecting core members of two cable conductors to each other is provided. The connector include two end members. Each end member comprises a first coupler end and a second wedge contact end. A splice coupler connects the first coupler ends of the two end members to each other. A fastener is connected to the splice coupler, wherein the fastener combines with the splice coupler to interlock the first coupler ends in mating portions of the splice coupler.

20 Claims, 9 Drawing Sheets

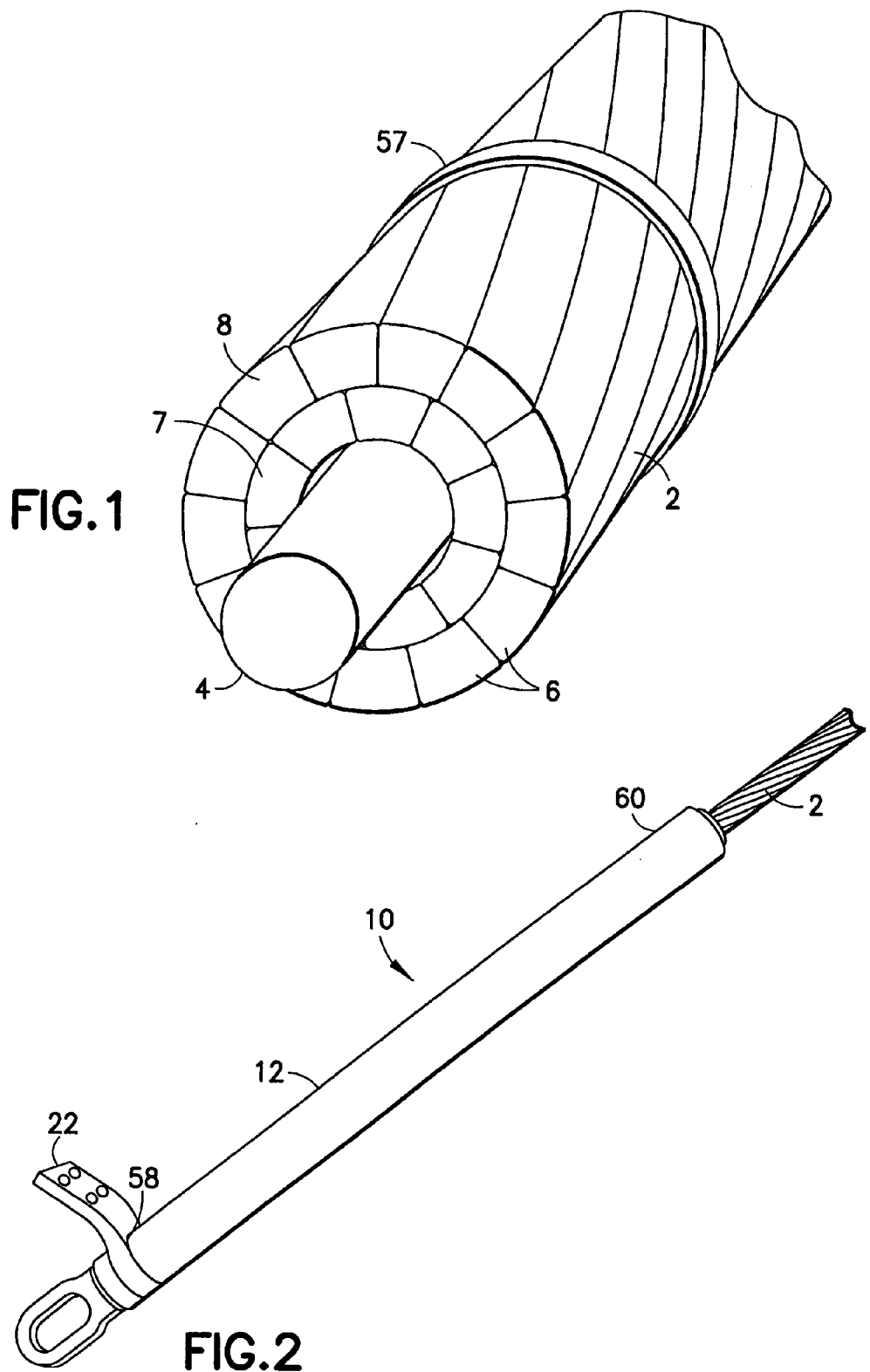

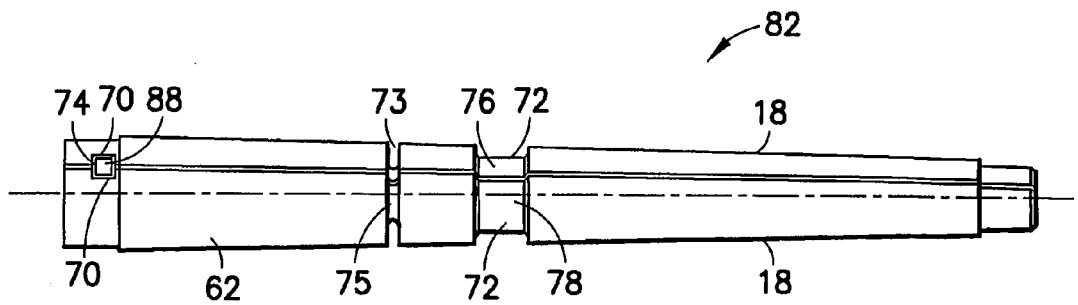
FIG.5
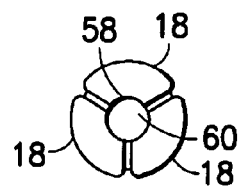
FIG.6
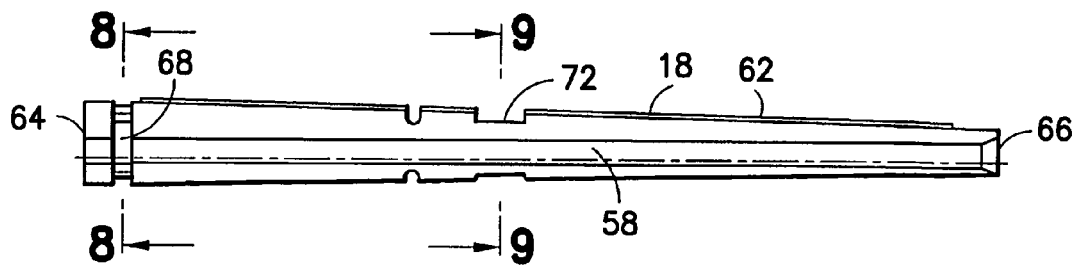
FIG.7
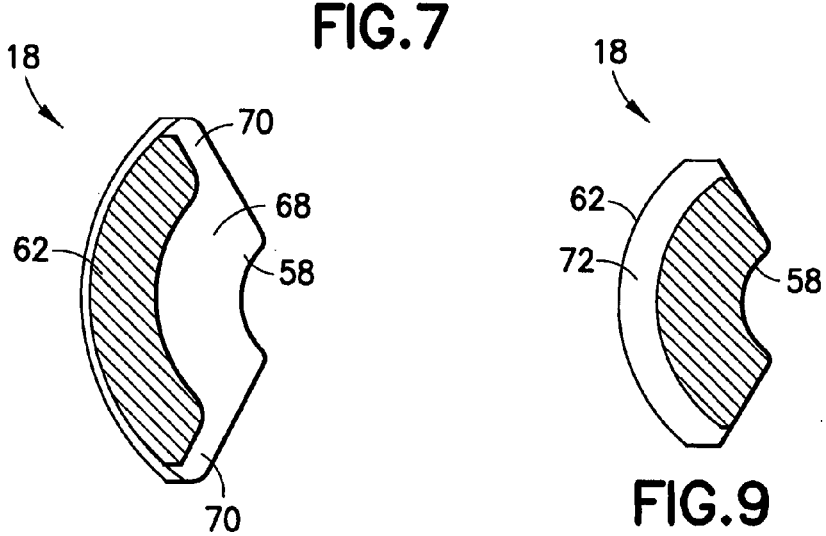
FIG.8
FIG.9

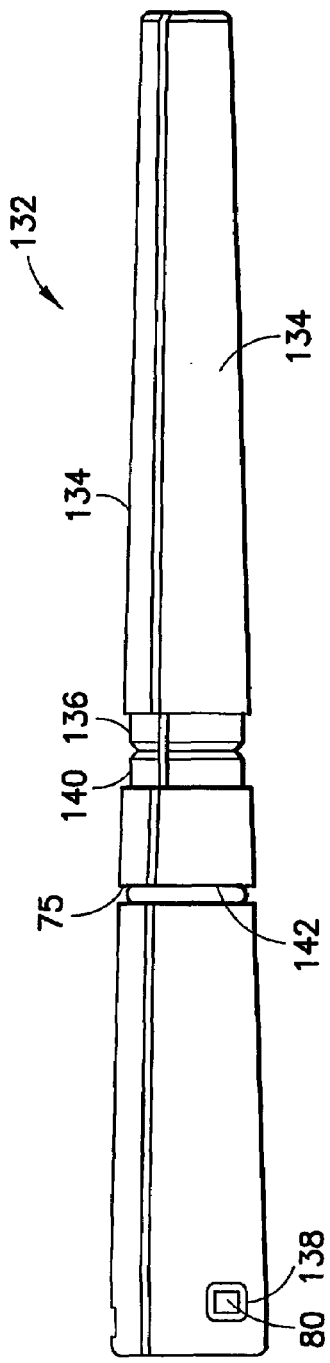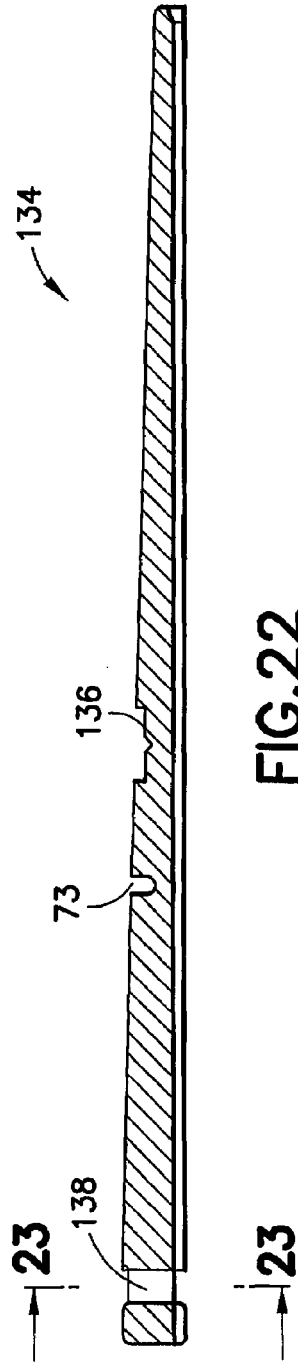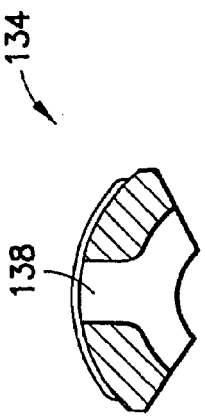

US 7,342,175 B2

ELECTRICAL CONNECTOR

CROSS REFERENCE TO RELATED APPLICATION

This application claim priority under 35 U.S.C. §119(e) to application Ser. No. 60/718,529 filed Sep. 19, 2005 which is hereby incorporated by reference in its entirety.

BACKGROUND OF THE INVENTION

1. Field of the Invention

The invention relates to an electrical connector and, more particularly, to an electrical connector which can be used for connecting to an Aluminum Conductor Composite Core (ACCC) cable.

2. Brief Description of Prior Developments

Aluminum conductor steel reinforced (ACSR) and other traditional energy cables utilize a steel wire core around which aluminum conductor wires are wrapped; a design originally introduced in 1898. Composite Technology Corporation (CTC) of Irvine, Calif. sells a new type of transmission and distribution energy cable; an Aluminum Conductor Composite Core (ACCC) cable. U.S. patent publication Nos. 2004/0132366 A1 and 2005/0129942 A1 describe Aluminum Conductor Composite Core (ACCC) cables. ACCC cables incorporate a light-weight advanced composite core around which aluminum conductor wires are wrapped in a manner similar to traditional energy cables. The composite core replaces the traditional steel wire core. The composite core's lighter-weight, smaller size, and enhanced strength and other performance advantages over traditional steel core allows a ACCC cable to double the current carrying capacity over existing transmission and distribution cables and virtually eliminate high-temperature sag.

However, there is a problem when attempting to connect conventional electrical connectors to an ACCC cable. The composite core, although providing an excellent tensile strength, such as about 21 tons, can only withstand a small compression force. The actual strength in compression is unknown, but is much lower than the tensile strength. A traditional compression electrical connector could crush or damage the composite core; preventing a good mechanical attachment from being made with the cable.

There is a need for an electrical connector which can be attached to a cable having a composite core, without crushing or significantly damaging the composite core, and which can provide a good tensile connection between the cable and the connector to allow the cable/connector assembly to be suspended by attachment to transmission towers.

SUMMARY OF THE INVENTION

In accordance with one aspect of the invention, a splice electrical connector for connecting core members of two cable conductors to each other is provided. The connector comprises two end members, wherein each end member comprises a first coupler end and a second wedge contact end; a splice coupler connecting the first coupler ends of the two end members to each other; and a fastener connected to the splice coupler, wherein the fastener combines with the splice coupler to interlock the first coupler ends in mating portions of the splice coupler.

In accordance with another aspect of the invention, a splice electrical connector for connecting core members of two cable conductors to each other is provided. The connector comprises two end members, a splice coupler, and a fastener. Each end member comprises a first end and a second end. The splice coupler connects the first ends of the two end members to each other. The fastener is connected to the splice coupler, wherein the fastener extends between the first ends to space the first ends apart and combines with the splice coupler to interlock the first ends in mating portions of the splice coupler.

In accordance with another aspect of the invention, a splice electrical connector for connecting core members of two cable conductors to each other is provided. The connector comprises two end members, a splice coupler, and a fastener. Each end member comprises a first end and a second end. The splice coupler connects the first ends of the two end members to each other, wherein the splice coupler comprises two coupler members which surround the first ends of the two end members. The fastener is connected to the splice coupler. The fastener comprises a pin having opposite ends respectively coupled to the two coupler members. The pin extends between the first ends to space the first ends apart, and wherein the pin combines with the splice coupler to interlock the first ends in mating portions of the splice coupler.

BRIEF DESCRIPTION OF THE DRAWINGS

The foregoing aspects and other features of the invention are explained in the following description, taken in connection with the accompanying drawings, wherein:

FIG. 1 is a perspective view of an end of an Aluminum Conductor Composite Core (ACCC) cable;

FIG. 2 is a perspective view of a connector and cable assembly;

FIG. 5 is a side view of a wedge assembly used in the assembly shown in FIG. 4;

FIG. 6 is an end view of the wedge assembly shown in FIG. 5;

FIG. 7 is a side view of one of the wedges of the assembly shown in FIG. 5;

FIG. 8 is a cross sectional view of the wedge shown in FIG. 7 taken along line 8-8;

FIG. 9 is a cross sectional view of the wedge shown in FIG. 7 taken along line 9-9;

FIG. 21 is a side view of the subassembly shown in FIG. 20;

FIG. 22 is a cross sectional view of one of the wedges used in the subassembly shown in FIGS. 20-21; and FIG. 23 is a cross sectional view of the wedge shown in FIG. 22 taken along line 23-23.

DETAILED DESCRIPTION OF THE PREFERRED EMBODIMENTS

Figure 3:
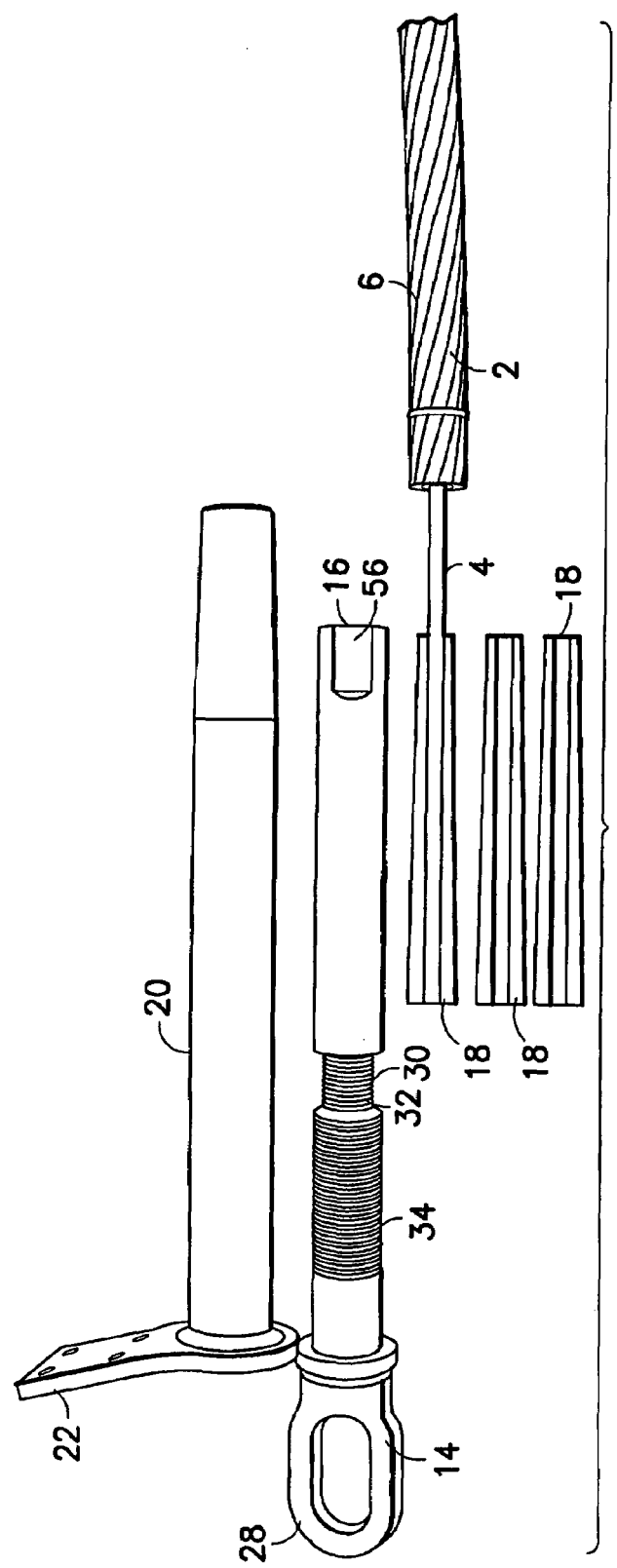
FIG. 3 is an exploded view of the connector and cable assembly shown in FIG. 2.

Referring to FIG. 1, there is shown a perspective view of an end of an Aluminum Conductor Composite Core (ACCC) cable 2. The ACCC cable incorporate a light-weight advanced composite core 4, such as a carbon composite, around which conductor wires 6, such as made of aluminum, are wrapped. In the embodiment shown, the wires 6 include inner strands 7 surrounded by outer strands 8. New transmission conductors with composite cores, as apposed to steel cores, are both lighter and have greater current carrying capacity, allowing more power to flow in existing rights-of way. ACCC (Aluminum Conductor Composite Core) cable can double the current carrying capacity over existing transmission and distribution cable and can dramatically increase system reliability by virtually eliminating high-temperature sag. ACCC cable is superior to existing cable such as ACSR and ACSS in a number of key performance areas. These performance advantages address key problems plaguing the utility market and offer significant benefits to electric utility companies and ultimately to their industrial, commercial and residential customers.

Referring also to FIG. 2, a cable and connector assembly 10 is shown incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 4:
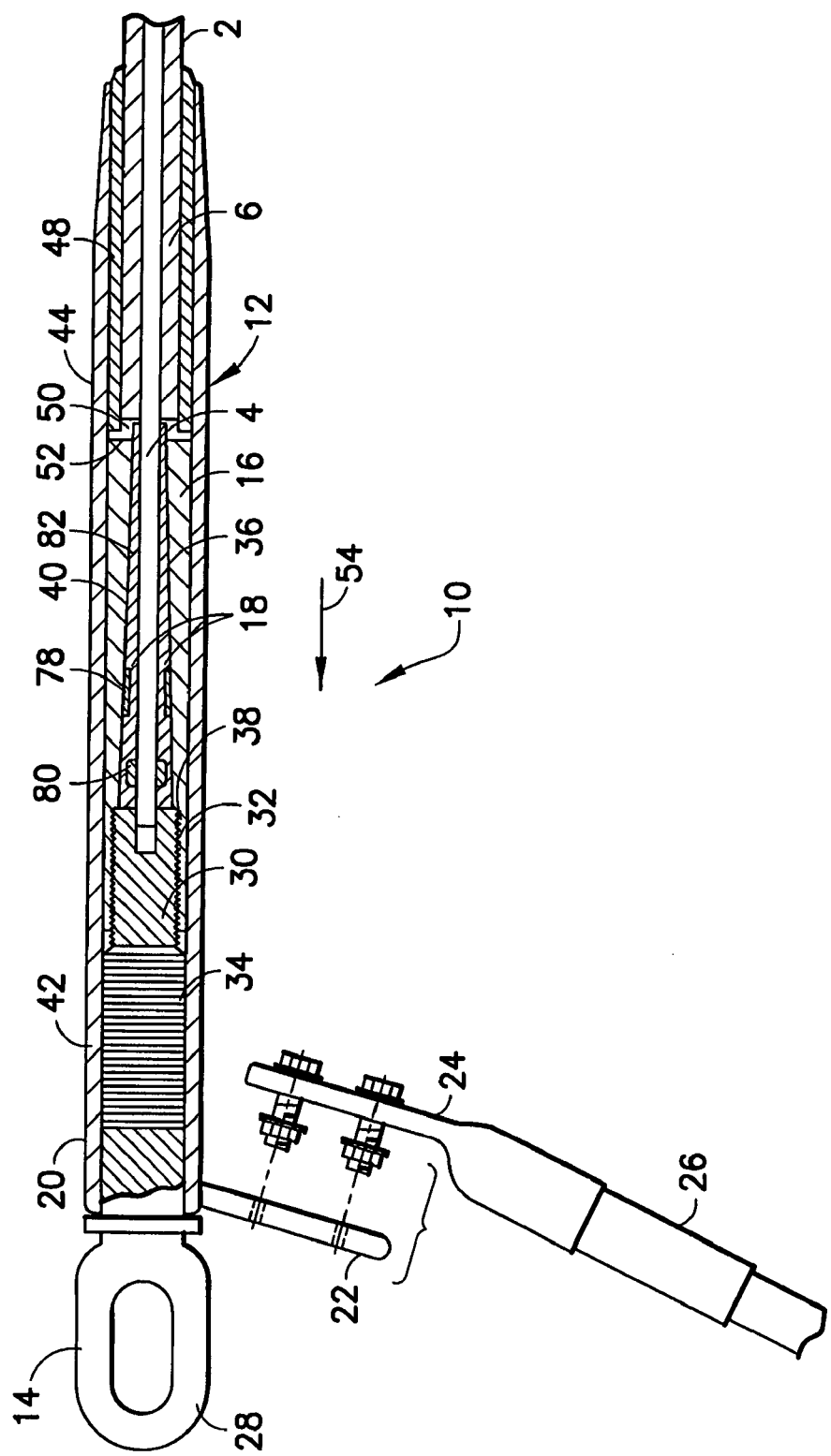
FIG. 4 is a cross sectional view of the connector and cable assembly shown in FIG. 2.
Figure 10:
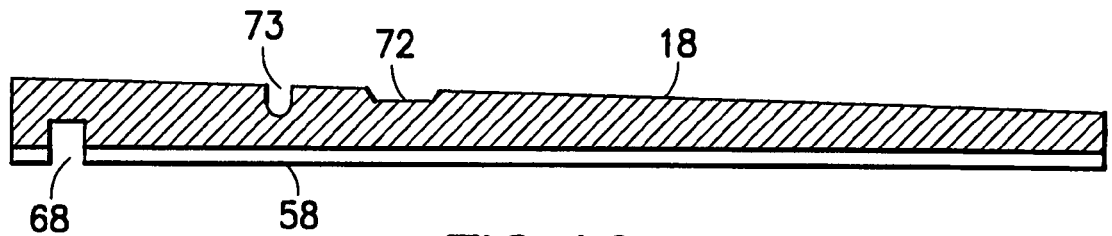
FIG. 10 is a cross sectional view of the wedge shown in FIG. 7.

The assembly 10 includes the cable 2 and an electrical connector 12. In this embodiment the connector 12 is a dead end connector adapted to mechanically connect the end of the cable 2 to another member, such as a transmission tower. In alternate embodiments, the connector could comprise any suitably connector function, such as a splice connector for example. Referring also to FIGS. 3 and 4, the connector 12 generally comprises a dead end connector member 14, a housing or collet 16, wedges 18 and an outer sleeve 20. In the embodiment shown in FIGS. 3 and 4 the outer sleeve 20 comprises an integral tap or connection plate 22 for electrically connecting a connector 24 of another cable assembly 26 to the assembly 10. However, as seen in FIG. 2, the connection plate 22 need not be provided.

The dead end connector member 14 comprises a one-piece metal member, such as steel or aluminum, having an eyelet 28 at a first end section and an opposite second end section 30 with a threaded section 32. The dead end connector member 14 also comprises a ridge section 34. The eyelet 28 is adapted to be connected to another member, such as a transmission tower. The housing 16 is preferably a one piece metal member, such as comprised of steel. The housing 16 has a general tube shape with an inner channel 36 having a threaded section 38 at a first end and a tapered section 40 extending away from the threaded section 38.

The wedges 18 comprise three wedges-each having a general partially circular cross-section. However, in alternate embodiments, more or less than three wedges could be provided. The outer sides of the wedges are substantially smooth to be able to slide against the inside surface of the tapered section 40. The inner sides of the wedges are adapted to grip onto the exterior surface of the core 4 of the cable 2. The wedges 18 can contact one another when fully inserted into the housing 16 to prevent crushing of the composite core 4. The wedges 18 have a suitable length, such as about 11 inches in one example, to provide a large contact area with the composite core 4 to provide a good friction grip which will not come loose at high tensile force, such as about 21 tons for example, and reduces stress in compression on the surface of the composite core.

Referring also to FIGS. 5 and 6, as noted above, in this embodiment the connector 12 comprises three of the wedges or jaws 18. The wedges 18 each have a same shape, but in alternate embodiments one or more of the wedges could have a different shape. Referring also to FIGS. 7-10, the wedges each have an inner concave surface 58 which combine to form a core receiving area 60 for receiving the cable core 4. The surfaces 58 are preferably uniform along the length of each wedge 18 to provide a uniform compression force along the length of the core 4 in the receiving area 60. The surface 58 could comprise a gripping feature, such as small serrations or teeth. Located proximate the end 64 of each wedge 18, the inner surface 58 has a partially circular recess 68 and recess extensions 70 at opposite ends of the recess 68 which extend to the outer surface 62 of the wedge 18. When the wedges 18 are assembled with each other as seen in FIG. 5, the recess extensions 70 form three pockets 74; one pocket at each joint between two of the wedges. The pockets 74 extend from the recesses 68 to the outer surfaces of the wedges. In an alternate embodiment the pockets might not extend all the way to the outer surfaces of the wedges. The pockets 74 form key recesses for receiving key sections as further described below. In addition, when the wedges 18 are assembled relative to each other, the recesses 68 combine to form a generally annular recess at the cable core receiving area 60. The pockets 74 extend outward from this annular recess.

The outer surface 62 of each wedge has a general uniform tapered shape between the two ends 64, 66. This allows the wedges 18 to relatively easily slide along the inner channel 36 of the housing 16. The outer surface 62 of each wedge 18 also comprises a partially circular recesses 72 and 73. When the wedges are assembled relative to each other the recesses 72 and 73 form generally annular recesses 75 and 76 around the wedge assembly.

Figure 11:
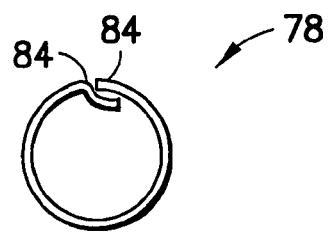
FIG. 11 is an end view of the extension spring member shown in the assembly of FIG. 5.
Figure 12:
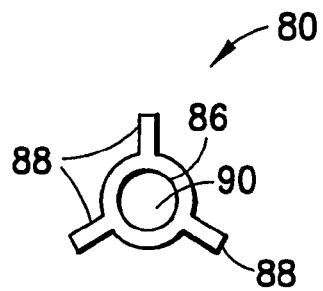
FIG. 12 is an end view of the interlock retainer shown in the assembly of FIG. 5.
Figure 13:
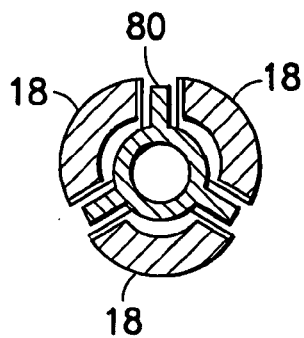
FIG. 13 is an exploded cross sectional view of the wedges and interlock retainer shown in FIG. 5.

Referring also to FIGS. 11-13 in this embodiment, as seen best in FIGS. 4 and 5, the wedges 18 are combined with an extension spring member 78 and an interlock retainer 80 to form an assembly 82. The extension spring member 78 can resiliently expand outwardly and contract inwardly. The extension spring member 78 is located in the annular recesses 75 or 76 (see FIG. 5) to retain the wedges 18 with one another, but which allows the wedges to expand outwardly when the cable core 4 is first inserted into the core receiving area 60 (see FIG. 6). In an alternate embodiment any suitable type of spring, system or member for retaining the wedges 18 together before insertion into the housing 16 could be provided. For example, the extension spring member could comprise a spring clip, or a garter spring, or an O-ring which could be used as an elastomeric extension spring (similar to a rubber band for example).

The interlock retainer 80 generally comprises a ring shaped section 86 and outward projections or key sections 88. The ring shaped section 86 is located in the annular recess formed by the recesses 68. The hole 90 in the ring shaped section 86 is sized and shaped to easily allow the cable core 4 to pass therethrough. The projections 88 extend into the pockets 74. The wedges 18 can move radially inward and outward relative to the ring shaped section 86 with the pockets 74 moving relative to the outward projections 88. The interlock retainer 80 is provided to keep the wedges 18 longitudinally aligned with one another as the assembly moves longitudinally inside the housing 16. Thus, all three wedges 18 are moved together by the interlock retainer 80 as the wedges 18 are pulled or pushed into the housing to their final resting position in the housing. In an alternate embodiment the interlock retainer could comprise any suitable type of shape so long as it interlocks the wedges 18 with each other for longitudinal movement in unison with each other. The extension spring member 78 helps to keep the wedges 18 and the interlock retainer 80 together before and during assembly into the housing. In another alternate embodiment the functions of the two retainers 78, 80 could be combined into a single member or the extension spring member 78 might not be provided.

Referring back to FIGS. 3 and 4, the outer sleeve 20 is made of electrically conductive metal, such as aluminum. The outer sleeve 20 has a general tube shape. The outer sleeve 20 is located around the housing 16. A first end 42 of the outer sleeve 20 is located over the ridge section 34 of the dead end connector member 14 and crimped or compressed onto the ridge section 34 to form an electrical and mechanical connection between the outer sleeve 20 and the dead end connector member 14. A second end 44 of the outer sleeve 20 is located over the wires 6 of the cable 2 and crimped or compressed onto the wires 6 to form a mechanical and electrical connection with the wires 6. Preferably, the force used to crimp the outer sleeve 20 to the wires 6 is less than the compressive strength of the composite core to prevent damage to the composite core 4. In the embodiment shown in FIG. 4, the assembly includes a filler sleeve 48 between the outer sleeve 20 and the cable 2. However, in an alternate embodiment the filler sleeve might not be provided.

The housing 16 is located over the exposed end of the composite core 4 and the wedges 18 are inserted into the housing 16 with the exposed composite core 4 being located between the wedges 18. In the preferred method, a gap 50 is provided between the rear end 52 of the housing 16 and the front end of the wires 6. When the wedges 18 are inserted between the housing 16 and the composite core 4, a small portion of the core 4 extends past the front end of the wedges, such as about ¼ inch for example.

To connect the connector 12 to the cable 2, the dead end connector member 14 is positioned on the end of the exposed composite core 4 with the second end 30 located against the front ends of the wedges 18. The housing 16 is then pulled or slid towards the dead end connector member 14 as illustrated by arrow 54. This helps to push the wedges 18 inside the housing 16 and readies the assembly for threading of the housing 16 to the threaded section 32 of the dead end connector member 14. The dead end connector member 14 can be screwed together with the housing 16. A tool can be placed inside the eyelet 28 and a wrench can be attached to the flat sections 56 of the housing to rotate the two members 14, 16 relative to each other. This tightens the dead end connector member 14 to the housing 16 to set the wedges 18. In a preferred embodiment, the dead end connector member will bottom out at a predetermined distance of the threaded section 32, such as about 1 inch.

With the housing 16 threaded onto the dead end connector member 14, the wedges 18 extend slightly past the rear end of the housing 16. The gap 50 provides a space for the ends of the wedges 18 to move into without encountering interference from the wires 6. The gap 50 also provides a space for aluminum sleeve compression/expansion of the wires 6 during crimping of the outer sleeve 20 and filler sleeve 48 to the wires. The cable tie 57 (see FIG. 1) can be cut away from the wires 6. The outer sleeve 20 and filler sleeve 48 can be slid forward with the outer sleeve 20 stopping against a butt stop on the dead end connector member 14. Referring also to FIG. 2, the front end 58 of the outer sleeve 20 can be crimped onto the dead end connector member 14. The rear end 60 of the outer sleeve 20 can be crimped with the filler sleeve 48 onto the wires 6 of the cable 2. This completes assembly of the electrical connector 12 with the cable 2. The outer sleeve 20 provides an electrical connection of the wires 6 to another member. The connector member 14, housing 16 and wedges 18 provide a mechanical connection of the composite core 4 to another member.

The components 18, 78 and 80 form a gripping device. This gripping device is assembled into the tapered inner diameter cylindrical tube of the housing. The utility cable core is inserted into the housing and thru the gripping device. When force is applied in an opposite direction, the gripping device wedges between the conical taper and the conductor core, thus preventing the conductor core from pulling out. The retainer 80 keeps the three jaws 18 traveling in a longitudinal direction at the same time as the three jaws 18 travel down into the smaller end of the taper. The extension spring member 78 is provided to apply an amount of force to the outer taper of the jaws 18, thus creating pressure on the conductor core before insertion into the housing and during initial insertion. This makes handling of all the components 18, 78, 80, 16, 2 much easier for an installer than if the components 18, 78 were not preassembled with one another in a subassembly. When the gripping device has a firm grip onto the conductor core, both the jaws 18 and the cable 2 travel as an assembly down the taper of the housing, thus locking the jaws 18 firmly between the housing and the conductor core.

A problem with composite core material used in an ACCC conductor is that the core is prone to pre-mature failure due to stress concentrations caused by a highly localized clamping force of conventional utility line connectors. The invention accomplishes a distributed clamp loading (as opposed to a localized loading) on the composite core by precision machining of the gripping components and housings. The invention can use a ductile material for the wedges or jaws 18 such that the resulting gripping components would, under a compression load from the wedging action inside the housing, conform to the exterior surface of the composite core and to the interior surface of the housing. This ductile deformation results in providing the distributed clamp loading along substantially the entire length of the wedges 18. The distributed clamp loading could be by a constant amount interference or by a variable amount of interference along the length of a gripping surfaces or the housing contact surfaces. The design could incorporate serrations, teeth, or other gripping features or finish to aid gripping of the composite core on the core gripping surface to increase the coefficient of friction.

With the invention using ductile conforming wedges, an electrical connector assembly can be provided comprising a connector member; a housing having a general tube shape, wherein the housing comprises a front end and a rear end, wherein the front end of the housing is fixedly mounted onto the connector member; and ductile conforming wedges located directly between the housing and a core member of a cable conductor. The ductile conforming wedges are comprised of a ductile material such that the ductile conforming wedges conform to an outer surface of the core member and an inner surface of the housing as the wedges are wedged between the core member and the housing.

Figure 14:
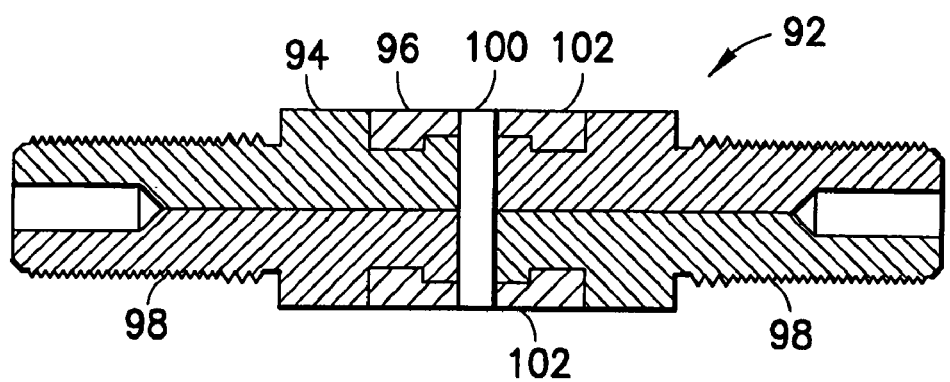
FIG. 14 is a cross sectional view of a subassembly of a splice connector comprising features of the invention.
Figure 15:
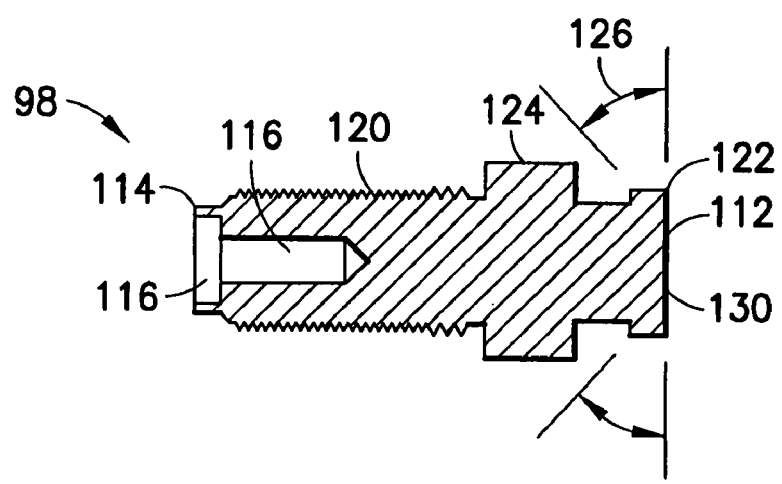
FIG. 15 is a cross sectional view of one of the end members used in the subassembly shown in FIG. 14.
Figure 16:
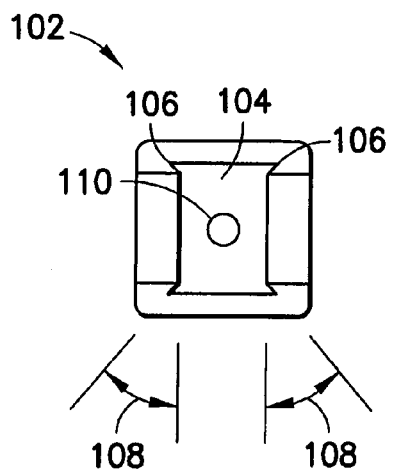
FIG. 16 is a bottom view of one of the splice coupler half members used in the subassembly shown in FIG. 14.
Figure 17:
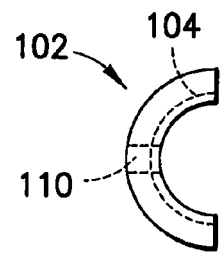
FIG. 17 is an end view of the splice coupler half member shown in FIG. 16.
Figure 18:
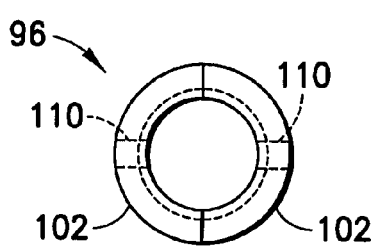
FIG. 18 is an end view of two of the splice coupler half members shown in FIG. 17 shown in a mated position.

Referring now to FIG. 14, a cross sectional view of a portion of a splice electrical connector 92 for connecting two of the ACCC cables 2 (see FIG. 1) to each other is shown. The electrical connector 92 generally comprises the splice subassembly 94 shown in FIG. 14, and two sets of housings 16, wedge assemblies 82, filler sleeves 48, and a single outer sleeve or two outer sleeves similar to outer sleeve 20 but without the plate 22 (all described with reference to FIGS. 1-13). Referring also to FIGS. 15-19, the subassembly 94 generally comprises a splice coupler 96, two end members 98 and a fastener 100. The splice coupler 96 comprises two splice coupler members 104. In this embodiment the members 104 are identical to each other, but in alternate embodiments they could be different. In addition, more or less than two coupler members could be provided. Each coupler member 102 has a general cross sectional C shape. As best seen in FIG. 18, when the two coupler members 102 are assembled, they form a general cylindrical tube. As seen best in FIG. 16, a semi-annular recess 104 is provided inside the inner side of the coupler member 102. Ends 106 of the recess 104 are angled as indicated by angles 108. This forms a wedge shaped recess at the ends 106. The ends 106 form internal lips with reverse internal locking angles. The lips are designed such that when the mating lips of the end members 98 make contact with the reverse angle lips of the coupler, the two members 102 become locked in the subassembly. Each coupler member 102 also has a hole 110 which extends into the recess 104.

The end members 98 are identical to each other, but in alternate embodiments they could be different. Each end member 98 comprises a one-piece member. However, in alternate embodiments each end member could comprise more than one member, such as two half members. Each end member 98 comprises a first coupler end 112 and a second wedge contact end 114. The second wedge contact end 114 is adapted to contact the ends 64 of the wedges 18. The end 114 includes a small pocket 116 for the ends 64 and a recess 118 for the extending end of the cable core 4. The end 114 also includes exterior threads 120 for screwing one of the housings on the end 114. The first coupler end 112 is adapted to be connected to the coupler 96. More specifically, the first coupler end 112 is sized and shaped to be located in the recesses 104. The end 112 has an outward projection 122 with an angled front face 124. The angle 126 is substantially the same as the angles 108. This forms a wedge shaped section.

Figure 19:
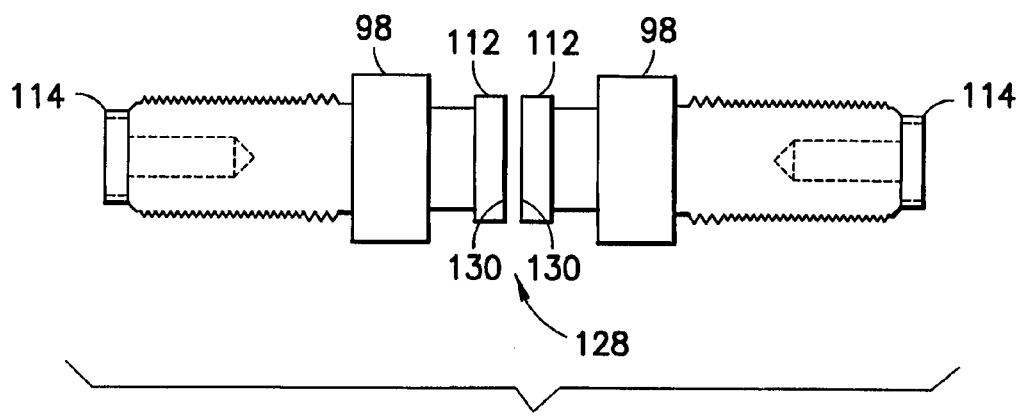
FIG. 19 is a side view showing how the two end members of the subassembly shown in FIG. 14 are located relative to each other for connecting the coupler members to the end members.
Figure 20:
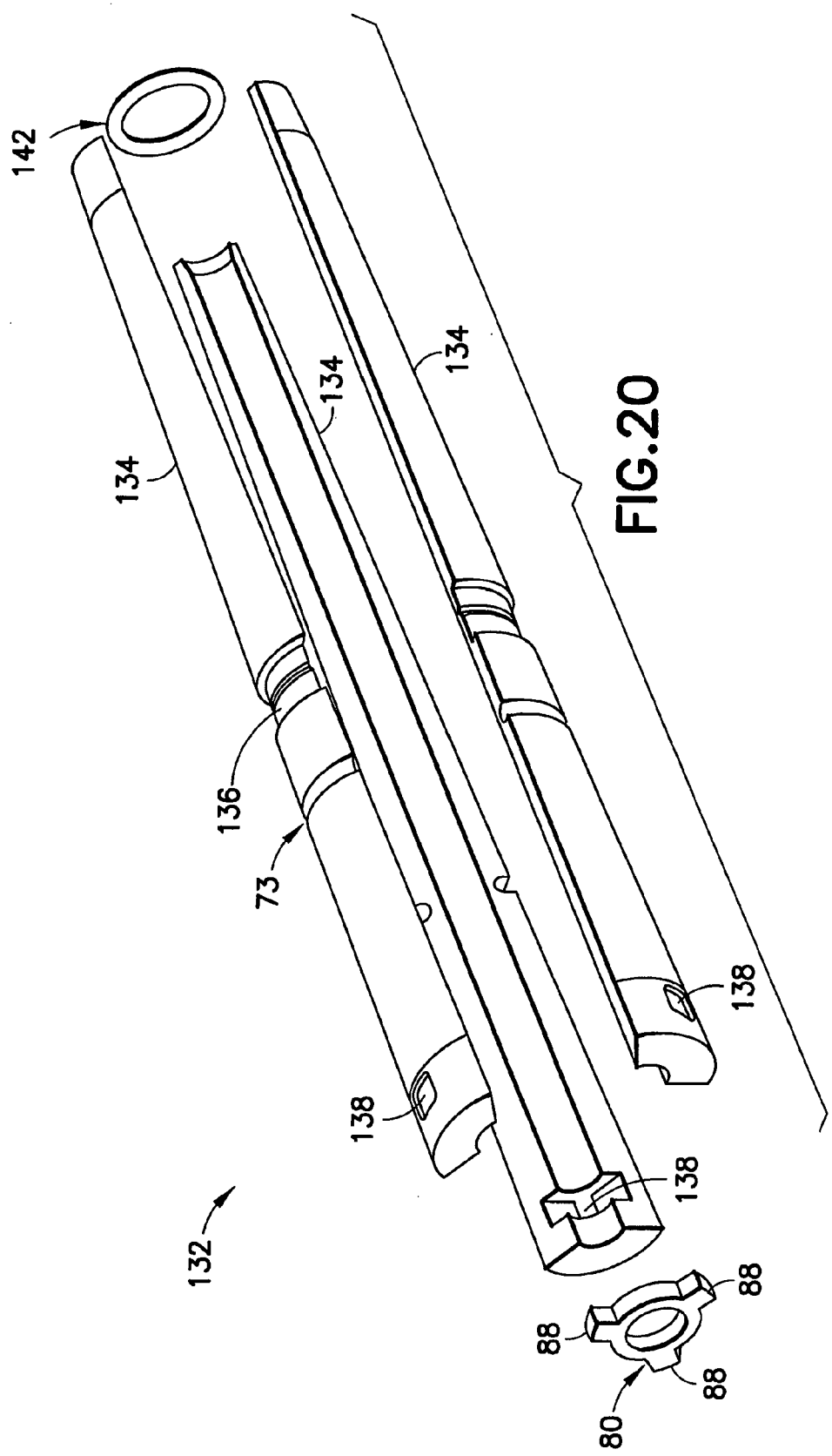
FIG. 20 is an exploded perspective view of a subassembly of an alternate embodiment of the present invention.

As seen with reference to FIG. 19, the two end members 98 can be placed back-to-back relative to each other with a gap 128 therebetween. The two coupler members 102 can be attached to the two first ends 112 with the angled front faces 124 wedging into the angled ends 106 of the coupler members 102. The fastener 100 can then be inserted into the holes 110. In this embodiment the fastener 100 comprises a pin which is press-fit mounted to the two coupler members 102. In alternate embodiments any suitable fastener or fastening system could be used. When the pin 100 is inserted into the holes 110 it is located against the rear end faces 130 of the end members 98 to wedge the end members apart and keep the angled front faces 124 interlocked with the ends 106 of the coupler members 96. Once assembled, the subassembly can be used with the other components of the splice connector mentioned above to connect two of the cables 2 to each other; one cable at each one of the end members 98 similar to the connection to the connector member 14 described above.

The subassembly is such that it creates its own locking system. One coupler member 102 is assembled to each end member 98. Then the other coupler member 102 is assembled to end members 98. The two end members 98 are pulled outward relative to each other and the pin 100 is installed. The first coupler ends 112 are forced outward by the pin 100 for the inner locking lips to interlock with each other. This creates the assembled subassembly.

Referring also to FIGS. 20-23 an alternate embodiment of a wedge/retainer/spring subassembly 132 is shown. The subassembly 132 comprises the interlock retainer 80, the extension spring retainer 142 and wedges 134. The wedges 134 each comprise a partially circular recess 73, a partially circular recess 136, and a key recess 138. The partially circular recesses 136 combine to form the annular recess 140. The partially circular recesses 73 combine to form the annular recess 75. In this embodiment the extension spring retainer 142 comprises an O-ring made of resilient polymer material. The extension spring retainer 142 is mounted in the annular recess 75. The annular recess 140 is similar to the recess 76, and is adapted to alternatively (or additionally) receive an extension spring retainer, such as a metal spring clip or garter extension spring.

The key recess 138 is located in the center of the end of the wedge 134; centrally located along a center longitudinal plane of the wedge. The retainer tabs or keying projections 88 of the retainer 80 are located in the recesses 138. The projections 88 interface at the center of each wedge rather than at the edges of the wedges. With this embodiment, greater performance reliability (less opportunity for sticking or jamming during field installation) can be provided. The design still includes an O-Ring or metal circular coil spring holding the assembly together. In this embodiment, the larger groove 140 is provided in the mid-section of the assembly to help facilitate fixtures for machining process and inspection.

In the past, there was a problem in that wedges, being connected to a conductor and inserted in a housing, did not necessarily move in unison during the insertion process. This could result in the conductor being subjected to uneven compression forces and perhaps damaged. This became an even more acute problem when dealing with cable having a composite core; which is more susceptible to damage than an ordinary metal conductor such as copper. The invention, by assuring that the wedges all move together as they are being longitudinally moved, overcomes this problem.

The provision of the wedges and the retainer created another problem in that they needed to be kept together with the conductor core immediately prior to insertion into the housing. This could be difficult in the field, such as when suspended or at an elevated height of an elevated high voltage, high tension electrical distribution cable. The provision of the extension spring member overcomes the problem of keeping the subassembly of the wedges and retainer together immediately before insertion into the housing. This allows the installer to not have to worry about the subassembly falling apart immediately before insertion into the housing.

The invention provides a solution to the need for an electrical connector which can be attached to a cable having a composite core, without crushing or significantly damaging the composite core, and which can provide a good tensile connection between the cable and the connector to allow the cable/connector assembly to be suspended by attachment to transmission towers.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A splice electrical connector for connecting core members of two cable conductors to each other, the connector comprising:
   two end members, wherein each end member comprises a first coupler end and a second wedge contact end;
   a splice coupler connecting the first coupler ends of the two end members to each other; and
   a fastener connected to the splice coupler, wherein the fastener combines with the splice coupler to interlock the first coupler ends in mating portions of the splice coupler.

2. A splice electrical connector as in claim 1 wherein the fastener extends between the first coupler ends to space the first coupler ends apart.

3. A splice electrical connector as in claim 2, wherein the splice coupler comprises a plurality of splice coupler members connected to each other, and wherein the fastener comprises a pin having opposite ends respectively connecting two of the splice coupler members with each other.

4. A splice electrical connector as in claim 2 wherein the first coupler ends each comprise a wedge shaped section, and the mating portions of the splice coupler comprise mating wedge shaped recesses.

5. A splice electrical connector as in claim 1 wherein the splice coupler comprises a plurality of splice coupler members connected to each other.

6. A splice electrical connector as in claim 5 wherein the fastener comprises a pin having opposite ends respectively connecting two of the splice coupler members with each other.

7. A splice electrical connector as in claim 5 wherein the splice coupler comprises two splice coupler members, wherein each splice coupler member comprises a generally half column shape with a fastener receiving hole extending through a wall of the splice coupler member.

8. A splice electrical connector as in claim 7 wherein an interior side of each splice coupler member comprises a semi-annular recess with opposite angled end walls.

9. A splice electrical connector as in claim 1 wherein the first coupler ends each comprise a wedge shaped section, and the mating portions of the splice coupler comprise mating wedge shaped recesses.

10. A splice electrical connector as in claim 1 wherein each end member comprises two half end members.

11. A splice electrical connector as in claim 1 wherein the second wedge contact ends of the end members each comprise an outer threaded area.

12. A splice electrical connector as in claim 1 further comprising a housing and wedges, wherein the second wedge contact ends of the end members comprise a contact surface adapted for contacting ends of the wedges, and a threaded area connecting the housing to the end members.

13. A splice electrical connector for connecting core members of two cable conductors to each other, the connector comprising:
   two end members, wherein each end member comprises a first end and a second end;
   a splice coupler connecting the first ends of the two end members to each other; and
   a fastener connected to the splice coupler, wherein the fastener extends between the first ends to space the first ends apart and combines with the splice coupler to interlock the first ends in mating portions of the splice coupler.

14. A splice electrical connector as in claim 13 wherein the splice coupler comprises a plurality of splice coupler members, and wherein the fastener comprises a pin having opposite ends respectively connecting two of the splice coupler members with each other.

15. A splice electrical connector as in claim 13 wherein the first ends each comprise a wedge shaped section, and the mating portions of the splice coupler comprise mating wedge shaped recesses.

16. A splice electrical connector as in claim 13 wherein the fastener comprises a pin.

17. A splice electrical connector as in claim 13 wherein the splice coupler comprises two splice coupler members, wherein each splice coupler member comprises a generally half column shape with a fastener receiving hole extending through a wall of the splice coupler member.

18. A splice electrical connector as in claim 17 wherein an interior side of each splice coupler member comprises a semi-annular recess with opposite angled end walls.

19. A splice electrical connector for connecting core members of two cable conductors to each other, the connector comprising:
   two end members, wherein each end member comprises a first end and a second end;
   a splice coupler connecting the first ends of the two end members to each other, wherein the splice coupler comprises two coupler members which surround the first ends of the two end members; and
   a fastener connected to the splice coupler, wherein the fastener comprises a pin having opposite ends respectively coupled to the two coupler members, wherein the pin extends between the first ends to space the first ends apart, and wherein the pin combines with the splice coupler to interlock the first ends in mating portions of the splice coupler.

20. A splice electrical connector as in claim 19 wherein each splice coupler member comprises a generally half column shape with a fastener receiving hole extending through a wall of the splice coupler member at a center of the splice coupler member.

* * * * *